United States Patent
Cho

(10) Patent No.: US 10,274,028 B2
(45) Date of Patent: Apr. 30, 2019

(54) METHOD FOR CONTROLLING CLUTCH FOR VEHICLE

(71) Applicants: HYUNDAI MOTOR COMPANY, Seoul (KR); KIA MOTORS CORPORATION, Seoul (KR)

(72) Inventor: Sung Hyun Cho, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/826,050

(22) Filed: Nov. 29, 2017

(65) Prior Publication Data

US 2019/0093714 A1  Mar. 28, 2019

(30) Foreign Application Priority Data

Sep. 25, 2017 (KR) .......... 10-2017-0123671

(51) Int. Cl.
*F16D 48/06* (2006.01)

(52) U.S. Cl.
CPC .... *F16D 48/06* (2013.01); *F16D 2500/10412* (2013.01); *F16D 2500/3144* (2013.01); *F16D 2500/50287* (2013.01)

(58) Field of Classification Search
CPC ........... F16D 48/06; F16D 2500/10412; F16D 2500/3144; F16D 2500/50287
See application file for complete search history.

(56) References Cited

U.S. PATENT DOCUMENTS

| | | | | |
|---|---|---|---|---|
| 6,767,311 | B2* | 7/2004 | Yoshikawa | F16D 48/08 477/174 |
| 2016/0003313 | A1* | 1/2016 | Kim | F16D 48/06 701/68 |
| 2016/0017995 | A1* | 1/2016 | Kondo | F16H 61/061 477/115 |

FOREIGN PATENT DOCUMENTS

| | | |
|---|---|---|
| JP | 5482633 B2 | 5/2014 |
| KR | 20140048005 A | 4/2014 |
| KR | 20140055192 A | 5/2014 |
| WO | WO 2014112606 A1 | 7/2014 |

* cited by examiner

*Primary Examiner* — Edwin A Young
(74) *Attorney, Agent, or Firm* — Brinks Gilson & Lione

(57) ABSTRACT

The present disclosure is configured to include a slip entry determining step of determining, by a controller, whether a driver in a full-lock control releases an accelerator pedal to thereby enter into a micro-slip control; a monitoring step of monitoring, by the controller, whether the release of the clutch occurs, in case of entering into the micro-slip control as a result of performing the slip entry determining step; a control amount adjusting step of resetting a feedback amount of a clutch control torque in the case that the release of the clutch occurs; and a clutch control step of controlling the clutch according to the clutch control torque as reset by the control amount adjusting step to thereby prevent or minimize the release of the clutch.

5 Claims, 3 Drawing Sheets

[FIG. 1]
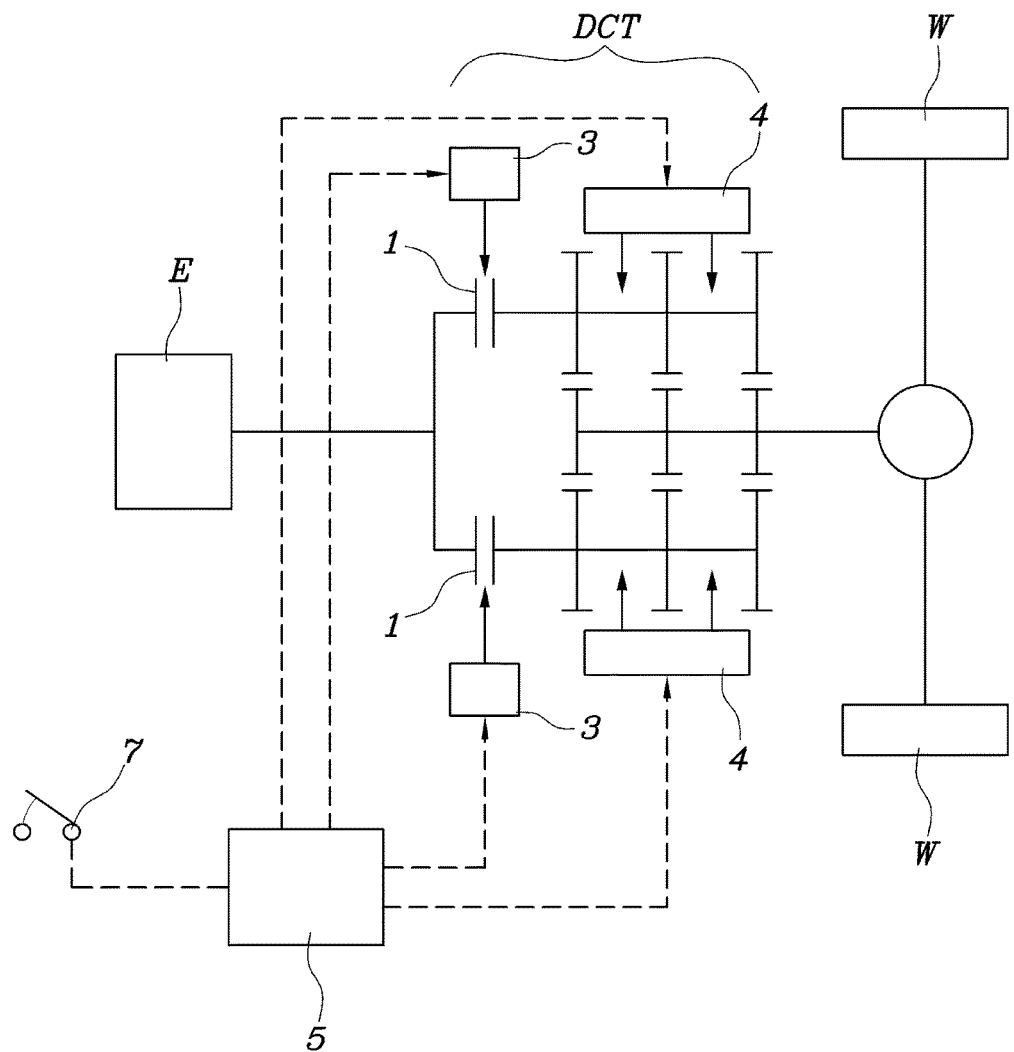

[FIG. 2]
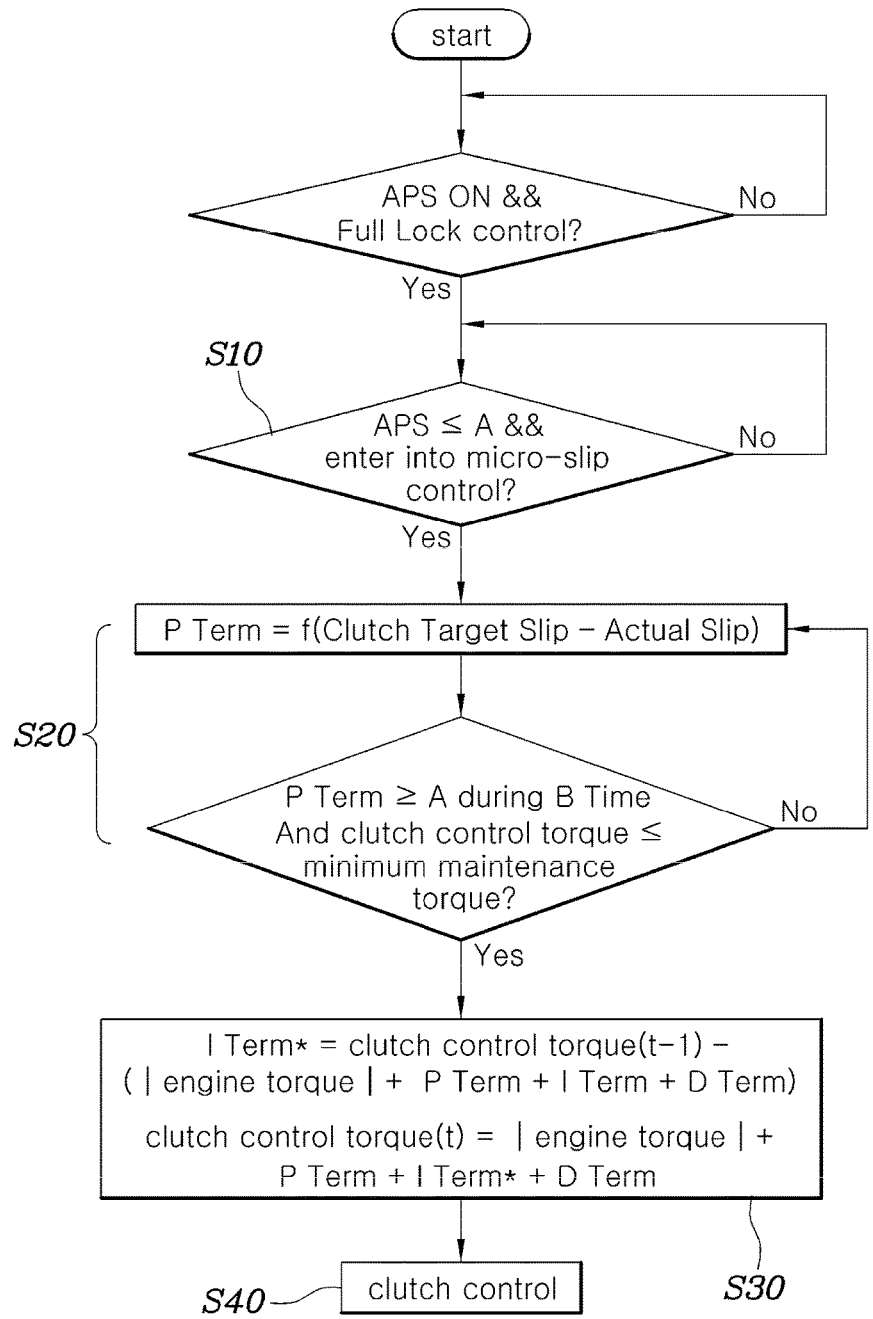

[FIG. 3]
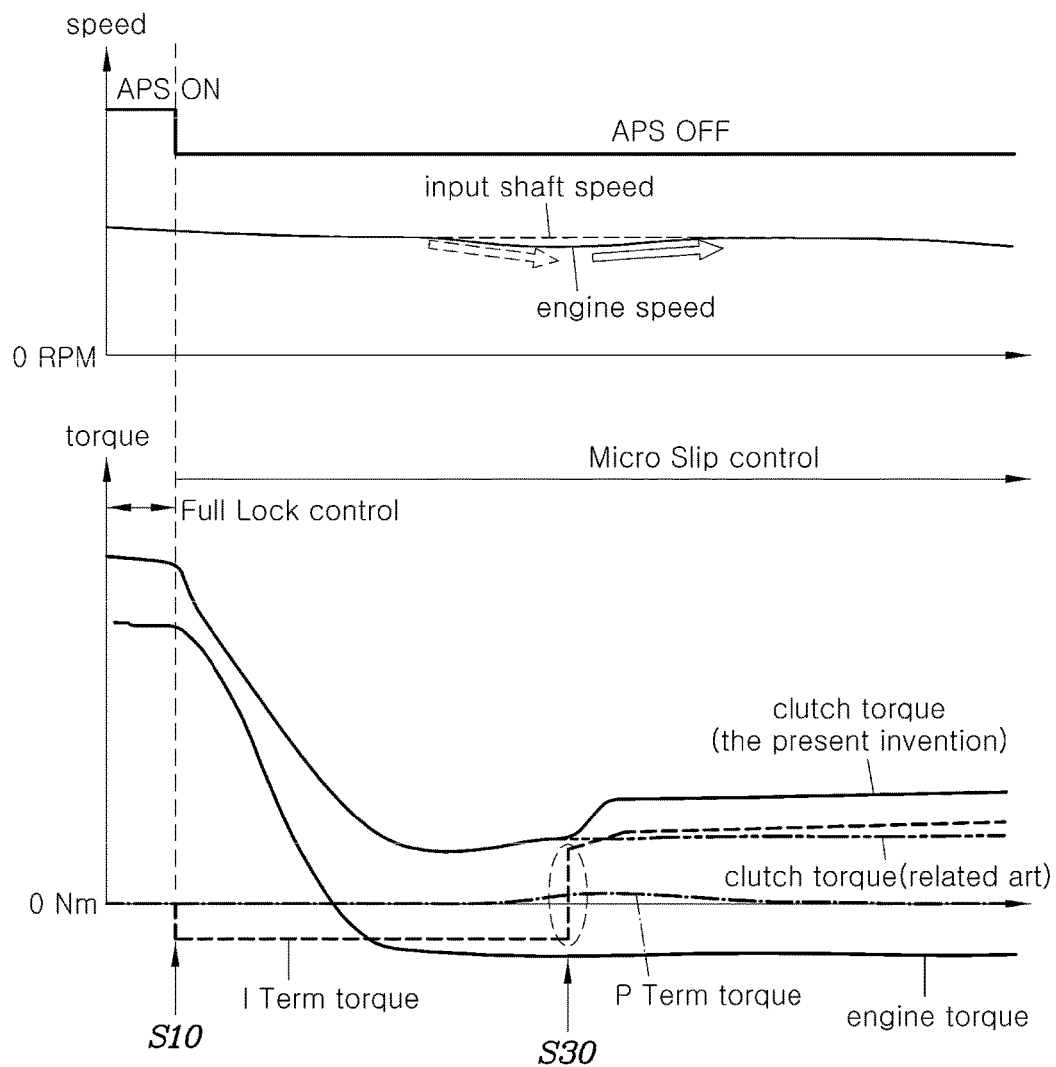

METHOD FOR CONTROLLING CLUTCH FOR VEHICLE

CROSS RELATED REFERENCE TO RELATED APPLICATION

The present application claims priority to and the benefit of Korean Patent Application No. 10-2017-0123671, filed Sep. 25, 2017, which is incorporated herein by reference in its entirety.

FIELD

The present disclosure relates to a method for controlling a clutch for a vehicle, and more particularly to a technology for controlling a torque of a clutch in driving of a vehicle which mounts a dry clutch.

BACKGROUND

The statements in this section merely provide background information related to the present disclosure and may not constitute prior art.

A vehicle, which mounts a dry clutch such as an Automated Manual Transmission (AMT) or a Dual Clutch Transmission (DCT) to a vehicle dynamometer, may control an accurate clutch transfer torque if a controller controlling the clutch accurately identifies a transfer torque characteristic of the clutch.

The dry clutch, since the transfer torque characteristic of the clutch with respect to a stroke of an actuator operating itself varies at almost every moment by a temperature or other several factors, tries to obtain data close to a characteristic of an actual clutch through learning if possible.

The transfer torque characteristic of the clutch with respect to the stroke of the actuator is defined as the relationship of the transfer torque of the clutch and the stroke of the actuator called torque-stroke curve (T-S curve) shown in a graph or a map, and while the controller updates the map through learning, always tries to obtain data close to actual clutch characteristic.

A traditional method that the controller learns the clutch characteristic uses a method that, while slightly slipping the clutch within dozens of revolutions per minute (RPM) under the relatively stable circumstance that there is usually no event such as a gear shifting and the like, calculates the transfer torque of the clutch according to the stroke of the actuator based on the equation of the motion of the clutch and an engine; and for satisfying the learning condition, the circumstance that the controller intentionally, slightly slips the clutch is called a MICRO-SLIP circumstance.

Meanwhile, although the MICRO-SLIP circumstance, as described above, requires for the learning of the clutch characteristic as described above, it is also true to result in loss of a power transfer; and thereby since by making the status with the clutch perfectly engaged under some circumstances that the necessity for the learning relatively reduces, it is possible to enhance fuel efficiency of a vehicle, as described above, the status that the clutch is perfectly engaged is called a FULL-LOCK status.

The foregoing is intended merely to aid in the understanding of the background of the present disclosure, and is not intended to mean that the present disclosure falls within the purview of the related art that is already known to those skilled in the art.

SUMMARY

The object of the present disclosure is to provide a method for controlling a clutch for a vehicle, under the circumstance that while a driver in the dry clutch-mounted vehicle releases an accelerator pedal which converts the clutch from a full-lock control status into a micro-slip control status and the release of the clutch occurs, the method prevents or reduced unnecessary release of the clutch by obtaining and maintaining a proper micro-slip control status to prevent the reduction of fuel efficiency by fuel-cut stop by an excessive release of the clutch and prevents or reduces occurrence of collision upon reengagement of the clutch after the release of the clutch, thereby enhancing driving quality of the vehicle.

A method for controlling a clutch for a vehicle according to the present disclosure includes a slip entry determining step of determining, by a controller, whether a driver in a full-lock control releases an accelerator pedal to thereby enter into a micro-slip control; a monitoring step of monitoring, by the controller, whether the release of the clutch occurs, in case of entering into the micro-slip control as a result of performing the slip entry determining step; a control amount adjusting step of resetting a feedback amount of a clutch control torque in the case that the release of the clutch occurs; and a clutch control step of controlling the clutch according to the clutch control torque as reset by the control amount adjusting step to thereby prevent or minimize the release of the clutch.

The monitoring step may calculate a proportional control component calculated based on a difference between a target slip amount and an actual slip amount of the clutch; and determine, in the case that a status that the calculated proportional control component is more than a predetermined reference value is maintained during more than a predetermined reference time and a current clutch control torque is less than a minimum maintenance torque, that the release of the clutch begins to occur.

The clutch control torque may be determined by adding the feedback amount to an absolute value of an engine torque; and the feedback amount may be determined by the sum of a proportional control component, an integral control component, and a derivative control component of a PID control.

The control amount adjusting step may change the integral control component constituting the clutch control torque to thereby perform the reset of the feedback amount.

In the control amount adjusting step, the integral control component may be changed into an updated integral control component;

the updated integral control component may be calculated by a difference between the clutch control torque of a previous control cycle and the clutch control torque of a current control cycle; and the clutch control torque of the current control cycle, after the calculation of the updated integral control component, may be recalculated using the updated integral control component.

The present disclosure, in the case that under the circumstance that a driver in the dry clutch-mounted vehicle releases an accelerator pedal to thereby convert the clutch from a full-lock control status into a micro-slip control and the release of the clutch occurs, overcomes unnecessary release of the clutch and obtains and maintains a proper micro-slip control status to prevent or reduce the reduction of fuel efficiency by fuel-cut stop by an excessive release of the clutch and to prevent or reduce occurrence of collision upon reengagement of the clutch after the release of the clutch, thereby enhancing driving quality of the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a configuration view illustrating a DCT vehicle that the present disclosure may be applied;

FIG. 2 is a flowchart illustrating a method for controlling a clutch for a vehicle according to the present disclosure; and FIG. 3 is a graph illustrating the method for controlling the clutch for the vehicle according to the present disclosure.

The drawing described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a power source of an engine (E) is configured to be supplied to a driving wheel (W) through a dual clutch transmission (DCT); two clutches 1 constituting the DCT are controlled by a clutch actuator 3, respectively; a shifting gear forming each shifting stage performs the shifting by a shifting actuator 4, which selects and drives synchronizing devices; the clutch actuator 3 and the shifting actuator 4 are controlled by a controller 5; and the controller receives a signal of an accelerator position sensor (APS) 7 for receiving an operation amount of the accelerator pedal.

Of course, the controller 5, in addition to the above information, receives information of an engine torque and an engine speed and the like.

One circumstance to which the present disclosure may be applied is the circumstance where a driver steps on the accelerator pedal and performs a full-lock control, then if a driver releases the accelerator pedal, the engine torque is reduced to be converted into the status that the engine supplies a drag torque being a negative torque to the clutch, and in this case, since there is a high possibility that the transfer torque characteristic of the clutch according to a large change of the engine torque varies, the controller begins to control a micro-slip control of the clutch for learning of new clutch characteristic; and the present disclosure, as illustrated in FIG. 3, in the case that the release phenomenon of the clutch begins to occur after start of the micro-slip control the clutch, relates to how to rapidly restrict the release and to maintain a normal micro-slip status.

Referring to FIG. 2, the method for controlling the clutch for the vehicle according to the present disclosure is configured to include a slip entry determining step S10 of determining, in a controller, if a driver in a full-lock control releases the accelerator pedal to thereby enter into a micro-slip control; as a result of performing the slip entry determining step S10, in case of entering into the micro-slip control, a monitoring step S20 of monitoring, in the controller, if the release of the clutch occurs; in the case that the release of the clutch occurs, a control amount adjusting step S30 of resetting a feedback amount of a clutch control torque; and a clutch control step S40 of controlling the clutch according to the clutch control torque as reset by the control amount adjusting step S30 to thereby prevent or minimize the release of the clutch.

The slip entry determining step S10 determines if the APS signal becomes less than a predetermined A value to enter into a micro-slip control; and the A, for example, may become 0 being the status that the accelerator pedal is never stepped on and according to the circumstances, may be set as a value that it is determined to be slightly stepped on but is mostly released.

The monitoring step S20 calculates a proportional control component calculated based on a difference between a target slip amount and an actual slip amount of the clutch; and in the case that the status that the calculated proportional control component is more than a predetermined reference value is maintained during more than a predetermined reference time and a current clutch control torque is less than a minimum maintenance torque, determines that the release of the clutch begins to occur.

The proportional control component means a P component of a Proportional integral Derivative (PID) control; as described above, is determined by a method for multiplying the difference between the target slip amount and the actual slip amount of the clutch by a P gain separately set, and the like; and it follows the same technology spirit as a conventional, general PID control.

The predetermined reference value comparing the proportional control component may be set as the level, for example, such as about 2~3 Nm, that it is determined that it is larger than the proportional control component in a general micro-slip control and thereby the release of the clutch occurs; and the reference time, for more accurate determination, as described above, except for the case that the proportional control component larger than the reference value occurs once, may be set as about 30 to 50 msec, for example, so as to substantially identify the release of the clutch.

As a reference, the release of the clutch means the circumstance that a large slip, which exceeds a range of the slip amount of the clutch targeting in the micro-slip control of the clutch, occurs.

Meanwhile, the minimum maintenance torque is the value adding a constant offset torque (for example, about 10 Nm) to an absolute value of the engine torque; and it means a minimum of the clutch torque capable of preventing the slip of the clutch considering uncertainty of the engine torque inputted to the controller under the constant circumstance that the transfer torque of the clutch almost does not vary.

That is, the monitoring step S20, in the case that the proportional control component (P Term) is maintained as the status being more than the reference value during more than the reference time and the current clutch control torque is less than the minimum maintenance torque, determines that the release of the clutch begins to occur and thereby a control of the clutch through next control amount adjusting step S30 is required.

The clutch control torque is determined by adding a feedback amount to the absolute value of the engine torque; and the feedback amount is the sum of the proportional control component (P Term), an integral control component (I Term), and a derivative control component (D Term) of the PID control.

The control amount adjusting step S30 changes the integral control component (I Term) constituting the clutch control torque to perform the resetting of the feedback amount.

In the control amount adjusting step S30, the integral control component (I Term) is changed to the updated integral control component (I Term*); the updated integral control component (I Term*) is calculated by a difference between the clutch control torque of a previous control cycle and the clutch control torque of a current control cycle; and the clutch control torque of the current control cycle, after the calculation of the updated integral control component (I Term*), is recalculated using the updated integral control component (I Term*).

That is, as described above, under the general control circumstance, although the clutch control torque is simply determined by the integral control component (I Term) to be used in controlling the clutch, as described above, in the case that it is determined that the release of the clutch occurs, it is possible to obtain the updated integral control component (I Term*) and using it, to again obtain the clutch control torque of the current control cycle; and then using it, to control the clutch, thereby rapidly restricting for the release of the clutch to further proceed.

To again describe the present disclosure with reference to FIG. 3, in case of being converted from the full-lock control into the micro-slip control, the integral control component (I Term) is initialized as a negative value. It is because an initial value of the integral control component (I Term) is set as a value that subtracts the clutch control torque of the previous control cycle from the engine torque.

Under the above circumstance, under the circumstance that the engine torque is gradually reduced to generate a negative drag torque, in the case that the difference between an input shaft speed of the transmission and the engine speed occurs larger than the micro-slip, that is, in the case that the release begins to occur, although for overcoming the above, a value of the proportional control component of the PID control component largely varies, the integral control component (I Term), according to the related art, rapidly does not vary for corresponding to the release to still have a negative value and thereby, as indicated by a dotted line, as the clutch torque gradually increases, a control for restricting a rapid release is not performed; and it, as described above, causes side effects, such as stop of engine fuel-cut, collision upon reengagement of the clutch, and the like.

However, the present disclosure identifies occurrence of the release using that the proportional control component largely varies and then, in the control amount adjusting step S30, calculates the updated integral control component (I Term*) as described above; and using it, calculates the clutch control torque and then controls the clutch, thereby as illustrated, restricting the release of the clutch by a rapid increment of the clutch torque.

As a reference, FIG. 3, for better understanding, illustrates, as an example, the timing when the slip entry determining step S10 and the control amount adjusting step S30 are performed.

Although the specific embodiment of the present disclosure has been described for illustrative purposes, those skilled in the art will appreciate that various modifications, additions and substitutions are possible, without departing from the scope and spirit of the present disclosure as disclosed in the accompanying claims.

The description of the disclosure is merely exemplary in nature and, thus, variations that do not depart from the substance of the disclosure are intended to be within the scope of the disclosure. Such variations are not to be regarded as a departure from the spirit and scope of the disclosure.

The invention claimed is:

1. A method for controlling a clutch for a vehicle comprising:
   a slip entry determining step of determining, by a controller, whether a driver in a full-lock control releases an accelerator pedal to thereby enter into a micro-slip control;
   a monitoring step of monitoring, by the controller, whether the release of the clutch occurs, in case of entering into the micro-slip control as a result of performing the slip entry determining step;
   a control amount adjusting step of resetting a feedback amount of a clutch control torque in the case that the release of the clutch occurs; and
   a clutch control step of controlling the clutch according to the clutch control torque as reset by the control amount adjusting step to thereby minimize the release of the clutch.

2. The method for controlling the clutch for the vehicle according to claim 1, wherein the monitoring step calculates a proportional control component calculated based on a difference between a target slip amount and an actual slip amount of the clutch; and
   determines, in the case that a status that the calculated proportional control component is more than a predetermined reference value is maintained during more than a predetermined reference time and a current clutch control torque is less than a minimum maintenance torque, that the release of the clutch begins to occur.

3. The method for controlling the clutch for the vehicle according to claim 1, wherein the clutch control torque is determined by adding the feedback amount to an absolute value of an engine torque; and
   wherein the feedback amount is the sum of a proportional control component, an integral control component, and a derivative control component of a PID control.

4. The method for controlling the clutch for the vehicle according to claim 3, wherein the control amount adjusting step changes the integral control component constituting the clutch control torque to thereby perform the reset of the feedback amount.

5. The method for controlling the clutch for the vehicle according to claim 4, wherein in the control amount adjusting step, the integral control component is changed into an updated integral control component;
   the updated integral control component is calculated by a difference between the clutch control torque of a previous control cycle and the clutch control torque of a current control cycle; and
   the clutch control torque of the current control cycle, after the calculation of the updated integral control component, is recalculated using the updated integral control component.

* * * * *